United States Patent
Mendelson et al.

(10) Patent No.: US 8,887,549 B2
(45) Date of Patent: Nov. 18, 2014

(54) VALVE LEAKBY DIAGNOSTICS

(75) Inventors: Jay J. Mendelson, Hartsdale, NY (US); Christopher A. Mazza, Harleysville, PA (US); Scott Amsbaugh, Philadelphia, PA (US); Gary Francis Conner, Harleysville, PA (US); Edward T. Fisher, East Norriton, PA (US)

(73) Assignee: Brooks Instrument, LLC, Hatfield, PA (US)

( * ) Notice: Subject to any disclaimer, the term of this patent is extended or adjusted under 35 U.S.C. 154(b) by 760 days.

(21) Appl. No.: 12/527,660

(22) PCT Filed: Feb. 19, 2007

(86) PCT No.: PCT/US2007/062395
§ 371 (c)(1), (2), (4) Date: Jan. 6, 2010

(87) PCT Pub. No.: WO2008/103169
PCT Pub. Date: Aug. 28, 2008

(65) Prior Publication Data
US 2010/0132813 A1    Jun. 3, 2010

(51) Int. Cl.
*G01F 25/00* (2006.01)
*G01F 15/00* (2006.01)
*F17D 5/06* (2006.01)

(52) U.S. Cl.
CPC ............... *G01F 15/005* (2013.01); *F17D 5/06* (2013.01)
USPC ............................................ 73/1.34; 73/1.16

(58) Field of Classification Search
CPC .... E21B 47/1025; G01M 3/2807; G01M 3/26
USPC .............. 73/40.05, 1.16, 40, 1.34; 137/487.5, 137/613
See application file for complete search history.

(56) References Cited

U.S. PATENT DOCUMENTS

| | | | |
|---|---|---|---|
| 5,944,048 A * | 8/1999 | Bump et al. | 137/487.5 |
| 6,997,032 B2 * | 2/2006 | Mattar | 73/1.34 |
| 7,283,913 B2 * | 10/2007 | Garnaes | 702/51 |

FOREIGN PATENT DOCUMENTS

| | | |
|---|---|---|
| CN | 1043207 A | 6/1990 |
| JP | 08-159908 A | 6/1996 |

(Continued)

OTHER PUBLICATIONS

Zero Drift Diagnostics on Brooks Model 7950S, Technical Bulletin pp. 1-8, Jun. 2006.

(Continued)

*Primary Examiner* — Stephen M Hepperle
*Assistant Examiner* — R. K. Arundale
(74) *Attorney, Agent, or Firm* — McGuireWoods, LLP

(57) ABSTRACT

A method is disclosed for determining leakby in a flow controller (100) comprising a flow sensor (102), a flow control valve (106) and electronics (104). The electronics are coupled to the flow sensor, the flow control valve and configured to adjust the flow control valve in response to the signal of the flow sensor indicating the flow rate of the material such that a set flow rate of material through the flow controller is maintained. The steps of the method comprise determining (302) a zero drift (Qdrift) value for the flow sensor (102). Determining (304) a flow rate (Qflow) through the flow controller (100) when the control valve (106) is in the fully closed position. And determining (306) the leakby through the flow controller (100) where the leakby is equal Qflow-Qdrift.

11 Claims, 4 Drawing Sheets

(56) References Cited

FOREIGN PATENT DOCUMENTS

| JP | H08-159908 | 6/1996 | | |
|---|---|---|---|---|
| JP | 2000-180223 | 6/2000 | | |
| JP | 2000-180223 A | 6/2000 | | |
| WO | WO 2004/113863 A1 * | 12/2004 | .............. | G01M 3/28 |

OTHER PUBLICATIONS

Liang, "Using FIELDVUE® Instrumentation at Shanghai SECCO's Ethylene Cracker Plant", Emerson Global Users Exchange, Aug. 2006.

Dufrene et al "Digital Technology Allows for Enhanced Blower Performance and Unrealized Profits", Emerson Global Users Exchange, 2006.

Vigansky et al "Integrating AMS™ValveLink® Diagnostics into Plant Work Processes", Emerson Global Users Exchange, 2006.

Anderson et al "Achieving Optimal Performance From Your Control Valve Investment ( . . . And Your Process)", Emerson Global Users Exchange, 2006.

Wang, X.K; Li, F. and Li, L.M., "A Simple Method for Measuring Valve Leakby", Machinery Industry Standardization & Quality, vol. 4, p. 19 & 22, 1998.

Chen, M; Nan, JJ, "A Brief Discussion Concerning the Zero Drift of Mass Flow Meter", China Metrology, vol. 11, p. 53, 2004.

Taiwanese Office Action date mailed Aug. 1, 2013; Taiwanese Application No. 097103576.

Korean Office Action date mailed Apr. 26, 2013; Korean Application No. 10-2009-7019616.

* cited by examiner

VALVE LEAKBY DIAGNOSTICS

BACKGROUND OF THE INVENTION

Flow controllers are typically used to control the flow rate of a fluid in a process. Flow controllers are typically comprised of a flow sensor, a flow control valve and electronics (with optional software) to control the valve in response to the flow rate detected by the flow sensor. The flow sensor may be a thermal mass flow sensor, a Coriolis mass flow sensor, a positive displacement flow meter, or the like. Some flow controllers use valves that may not completely stop the flow of fluid when the valve is in the fully closed position. These types of flow controllers have a specified amount of fluid which may leak through the controller when the flow control valve is in the "off" or fully closed position. The amount of fluid leaking through the valve under these conditions is called leakby and is defined as the amount of fluid leaking through the flow controller when the controller is in the "off" or fully closed position. Manufacturers that use flow controllers may tune their process around this leakby specification. If the flow controller degrades or fails and the leakby value increases above the specification, manufactures may incur significant production scrap. Testing a flow controller for leakby currently requires removing or isolating the device from the process equipment and measuring the leakby value using an off-line piece of measurement equipment. Shutting down the process equipment to isolate the flow controller and attach the off-line measuring equipment may cause considerable downtime for the process equipment. In capital intensive facilities such as semiconductor factories, downtime can be very expensive.

ASPECTS

One aspect of the invention includes a method for determining leakby in a flow controller (100), comprising:
 determining a zero drift (Qdrift) value for the flow controller (100);
 determining a flow rate (Qflow) through the flow controller (100) when the flow controller (100) is in the fully closed position;
 determining the leakby through the flow controller (100) where the leakby is equal to Qflow-Qdrift.
 Preferably, the method further comprises:
 stopping flow through the flow controller (100) using a fluid device;
 determining the indicated flow rate through an internal flow sensor (102);
 comparing the indicated flow rate with a previously stored flow rate to determine the zero drift (Qdrift) value.
 Preferably, the method further comprises the fluid device is selected from the following group: a single external valve, a first external valve located on an inlet side of the flow controller and a second external valve located on an outlet side of the flow controller, a single integrated valve, a first integrated valve located on an inlet side of the flow controller and a second integrated valve located on an outlet side of the flow controller, a pump, a pressure release valve.
 Preferably, the method further comprises the fluid device is manually controlled.
 Preferably, the method further comprises the fluid device is electrically controlled.
 Preferably, the method further comprises:
 waiting a preset time before determining the indicated flow rate through the internal flow sensor (102).
 Preferably, the method further comprises determining a flow rate (Qflow) through the flow controller (100) further comprises:
 allowing flow through the flow controller (100);
 setting the flow controller (100) to the fully closed position;
 determining an indicated flow rate through an internal flow sensor (102) and equating the indicated flow rate to the flow rate (Qflow) through the flow controller (100).
 Preferably, the method further comprises:
 attaching an external device (110) to the flow controller (100) and operating the flow controller (100) using the external device (110) to determine the leakby.
 Preferably, the method further comprises:
 comparing the leakby with a threshold value;
 when the leakby is greater than the threshold value establishing an error condition.
 Another aspect of the invention comprises a flow controller, comprising:
 a flow sensor that generates a signal indicating the flow rate of a material flowing through the flow controller;
 a flow control valve;
 a display;
 an input device;
 electronics coupled to the flow sensor, the flow control valve, the display and the input device and configured to adjust the flow control valve in response to the signal indicating the flow rate of the material such that a set flow rate of material through the flow controller is maintained, and where the electronics are configured to determine a leakby value by determining a zero drift (Qdrift) value of the flow controller, determining a flow rate (Qflow) through the flow controller when the flow controller is in the fully closed position and determining the leakby through the flow controller where the leakby is equal to Qflow-Qdrift.
 Preferably, at least one shutoff valve configured to completely stop the flow of material through the flow controller.
 Preferably, at least one shutoff valve is electrically controlled.
 Preferably, the flow sensor is selected from the group: a Coriolis mass flow sensor, a single wire design thermal mass flow sensor, a two wire design thermal mass flow sensor, a positive displacement flow meter.
 Another aspect of the invention comprises a test system, comprising:
 a flow controller having an input/output port;
 at least one shutoff valve fluidly coupled to the flow controller and configured to stop the flow of material through the flow controller;
 a device coupled to the input/output port of the flow controller and configured to determine a leakby value by determining a zero drift (Qdrift) value of the flow controller, determining a flow rate (Qflow) through the flow controller when the flow controller is in the fully closed position and determining the leakby through the flow controller where the leakby is equal to Qflow-Qdrift.
 Preferably, at least one shutoff valve is electrically controlled.
 Preferably, the device is selected from the following group: a portable computer, a test device, a remote processor, a networked computer.
 Preferably, the flow controller includes a flow sensor which is selected from the group: a Coriolis mass flow sensor, a single wire design thermal mass flow sensor, a two wire design thermal mass flow sensor, a positive displacement flow meter.
 Another aspect of the invention comprises a test device, comprising:

electronics configured to be coupled to the input/output port of a flow controller and configured to determine a leakby value by determining a zero drift (Qdrift) value of the flow controller, determining a flow rate (Qflow) through the flow controller when the flow controller is in the fully closed position and determining the leakby through the flow controller where the leakby is equal to Qflow-Qdrift.

DETAILED DESCRIPTION

FIGS. 1-5 and the following description depict specific examples to teach those skilled in the art how to make and use the best mode of the invention. For the purpose of teaching inventive principles, some conventional aspects have been simplified or omitted. Those skilled in the art will appreciate variations from these examples that fall within the scope of the invention. Those skilled in the art will appreciate that the features described below can be combined in various ways to form multiple variations of the invention. As a result, the invention is not limited to the specific examples described below, but only by the claims and their equivalents.

Figure 1:
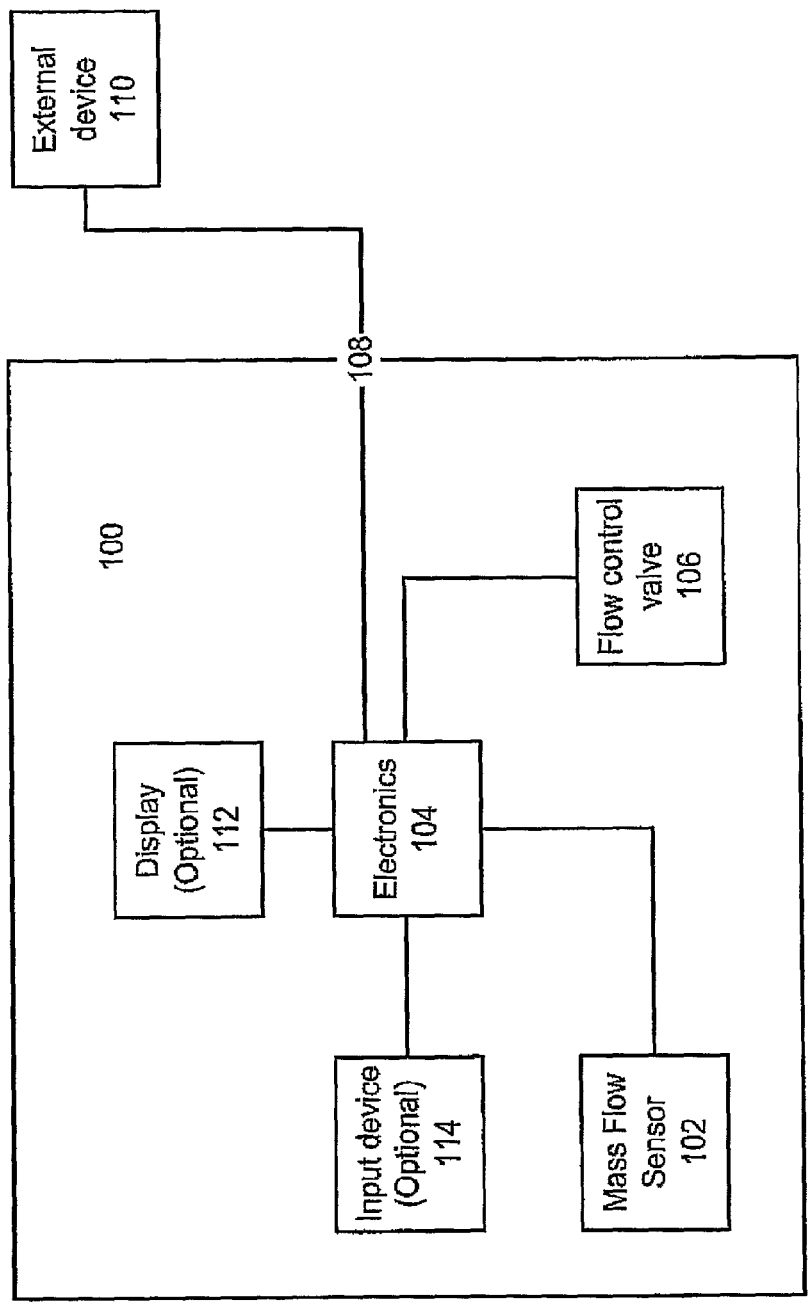
FIG. 1 is a block diagram of a flow controller 100 in an example embodiment of the invention.

FIG. 1 is a block diagram of a flow controller 100 in an example embodiment of the invention. Flow controller 100 comprises flow sensor 102, electronics 104, input/output port 108 and flow control valve 106. Flow sensor 102 and flow control valve 106 are coupled to electronics 104. Electronics 104 may be connected to an external device 110 using input/output port 108. External device 110 may be used to setup flow controller 100 or run diagnostics on flow controller 100. External device 110 may be a portable computer, a test device, a remote processor, a networked computer or the like. In operation, flow sensor 102 generates a signal indicating the flow rate of material passing through flow controller 100. Electronics 104 detect the flow signal generated by flow sensor 102. Electronics 104 adjust flow control valve 106 in response to the signal from flow sensor 102 to maintain the flow rate of material through flow controller 100. In one example embodiment of the invention, the flow controller may have a plurality of optional input devices 114, for example an analog voltage input that allows a user to set the flow control valve, a keyboard, or another analog voltage input that allows the user to set the flow controller setpoint command, and a display to allow the user to read flow through the flow controller without attaching an external device to input/output port 108.

Flow sensor 102 may be a one wire design thermal mass flow meter, a two wire design thermal mass flow meter, a Coriolis flow meter, a positive displacement flow meter, or any other type of flow meter. Flow control valve may be a needle valve, a butterfly valve, a solenoid valve, or any other type of valve that can be adjusted to a number of different positions between the closed position and the opened position.

Figure 2A:
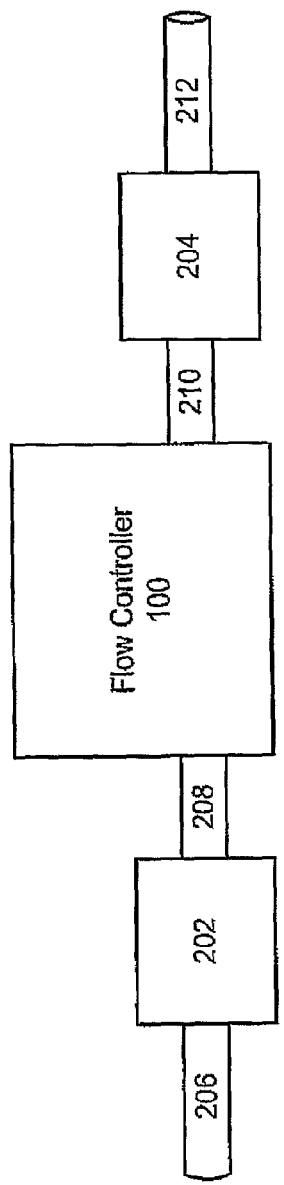
FIG. 2a is a drawing of flow controller 100 installed into process equipment using external valves in an example embodiment of the invention.
Figure 2B:
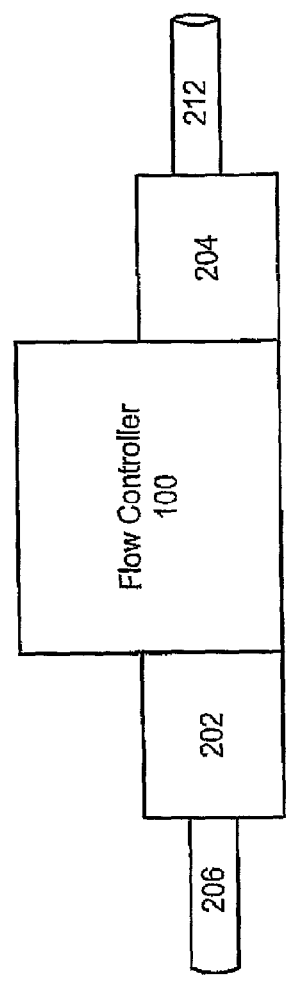
FIG. 2b is a drawing of flow controller 100 installed into process equipment with valves attached or integrated with flow controller 100 in an example embodiment of the invention.

FIG. 2a is a drawing of flow controller 100 installed into process equipment using external valves in an example embodiment of the invention. Pipe 206 couples valve 202 to process equipment (not shown). Pipe 208 couples valve 202 to the input side of flow controller 100. Pipe 210 couples the output side of flow controller 100 to valve 204. Pipe 212 couples valve 204 to more process equipment (not shown). In one example embodiment of the invention, valves 202 and 204 are external shutoff or blocking valves that can be used to isolate flow controller 100 from process equipment by completely blocking the flow of material through flow controller 100. In other example embodiment of the invention only one external shutoff valve may be used and placed at either the location of valve 202 or at the location of valve 204. During normal operation, valve 202 and valve 204 are in the open position allowing flow controller 100 to control the flow rate of material from pipe 206 to pipe 212. In one example embodiment of the invention, external valves 202 and 204 are manual valves and are manually operated by a user during the process used to determine the leakby value. In another example embodiment of the invention, external valves 202 and 204 are electronically controlled and are operated by flow controller 100, or by external device 110 during the process used to determine the leakby. In another example embodiment of the invention valves 202 and 204 may be attached directly to, or integrated into, flow controller 100 as shown in FIG. 2b.

Figure 3:
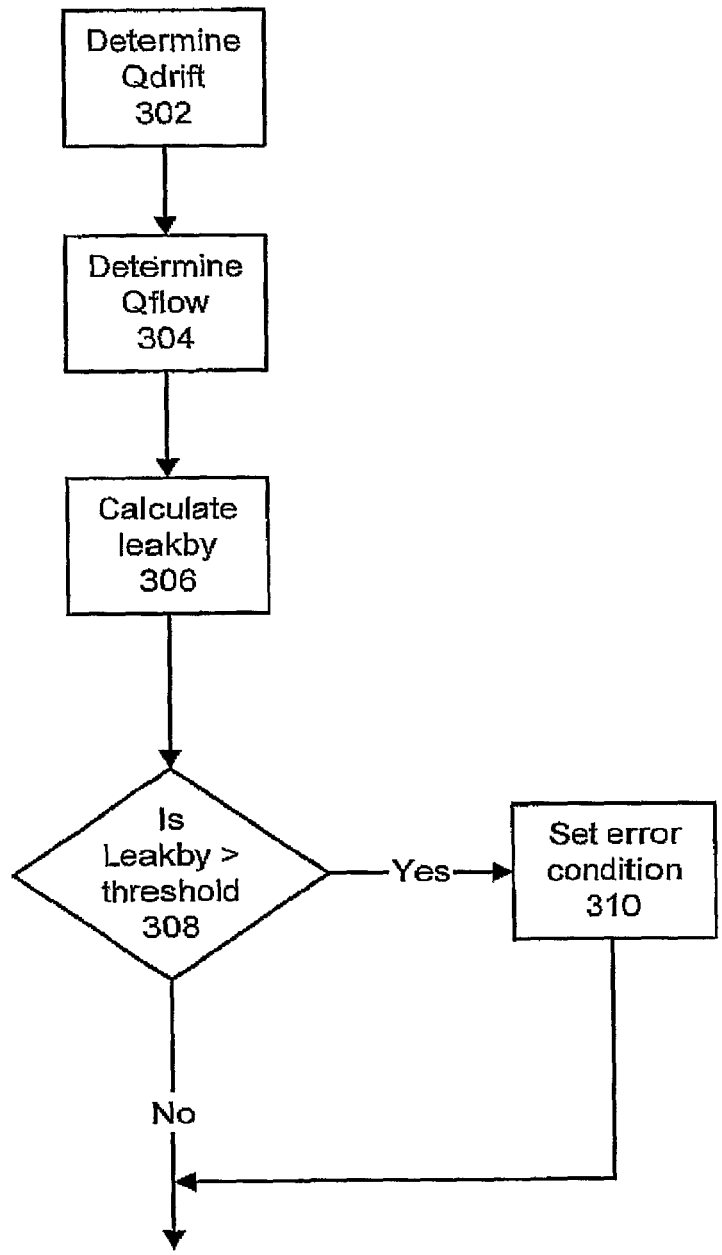
FIG. 3 is a flow chart for determining the leakby through flow controller 100 in an example embodiment of the invention.

FIG. 3 is a flow chart for determining the leakby through flow controller 100 in an example embodiment of the invention. At step 302 the zero drift (Qdrift) of the flow controller is determined. At step 304 the flow rate (Qflow) through the flow controller is determined. At step 306 the leakby through the flow controller is calculated as Qflow-Qdrift. At optional step 308 the leakby is compared against a threshold value. If leakby is greater than the threshold value an error condition is established at step 310. In one example embodiment of the invention, the leakby may be displayed or reported without being compared to a threshold value.

Figure 4:
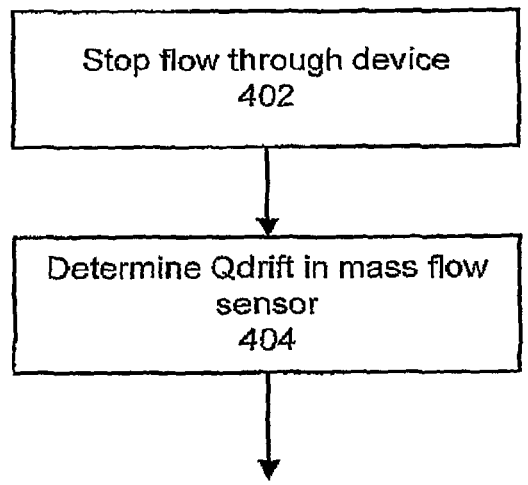
FIG. 4 is a flow chart showing the steps used to determine Qdrift in step 302 in an example embodiment of the invention.

FIG. 4 is a flow chart showing the steps used to determine Qdrift in step 302 in an example embodiment of the invention. At step 402, flow through the flow controller 100 is stopped. The flow may be stopped in a number of different ways. One way is to close a single external shutoff valve to prevent flow into or out-of the flow controller 100. In another example embodiment of the invention, two external or integrated valves (202 and 204), one on either side of the flow controller 100, may be used to stop the flow of material through flow controller 100. In other example embodiments of the invention, the process pump that drives the flow of fluid through flow controller 100 may be turned off. The external valves, integrated valves, pumps, pressure releases or other devices used to completely stop the flow of material through flow controller 100 are considered to be fluid devices. After turning off the pump or shutting a valve, it may take some time before the flow through flow controller 100 has completely stopped. Even when using a valve on either side of flow controller 100, it may take some time after closing both valves before the flow through flow controller 100 has stopped. In one example embodiment of the invention, a preset time period is allowed to elapse to ensure the flow through flow controller 100 has stopped.

Once the flow of material through flow controller 100 has stopped, the zero drift (Qdrift) of the flow sensor 102 is determined in step 404. Zero drift (Qdrift) is the magnitude of fluid flow as measured by the flow sensor 102 during a no-flow condition with respect to the last zero-point. During a known no-flow condition through the flow sensor 102, a zero-point is established that equates the indicated flow signal from the flow sensor 102 with zero flow. Zero drift (Qdrift) is the amount the mass flow sensor 102 has drifted at a no-flow condition compared to the zero-point. The zero drift measurement is dependent on environmental conditions, for example temperature. A large change in temperature in the flow controller 100 compared to the temperature of the device when the last zero flow zero-point was established may cause a large zero drift value. Zero drift may be determined from a single data point or may represent a number of different samples. Once the current zero drift (Qdrift) has been determined a new set-point for zero flow may be established by re-equating the current flow signal to zero flow. In one example embodiment of the invention, if the value of zero drift is larger than a threshold value, an error flag or error condition may be established.

Figure 5:
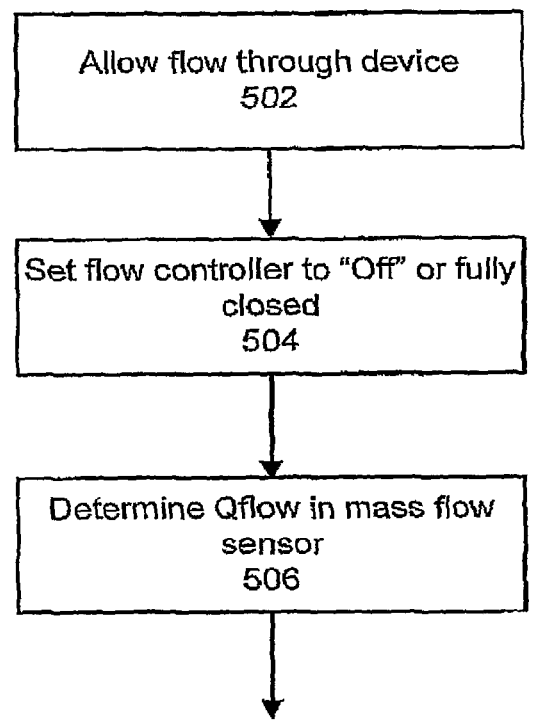
FIG. 5 is a flow chart showing the steps used to determine the flow rate (Qflow) through the flow controller in step 304 in one example embodiment of the invention.

FIG. 5 is a flow chart showing the steps used to determine the flow rate (Qflow) through flow controller 100 in step 304 in one example embodiment of the invention. At step 502 the flow controller 100 is re-integrated into the process system by opening any valves that were shut in step 302 or by turning on any pumps shut off in step 302. The flow controller 100 is set to "off" or the fully closed position in step 504. By setting flow controller 100 to the "off" position, any flow through flow controller 100 is due to leakage through flow control valve 106. In step 506 the flow (Qflow) through the flow sensor 102 is measured. Qflow may be determined from a single data point or may represent a number of different samples. Once Qflow is determined, the leakby through flow controller 100 is calculated as leakby=Qflow-Qdrift. Most flow controllers have a leakby specification. In some example embodiments of the invention if the calculated leakby is greater than the allowed leakby, an error condition may be established. In other example embodiments of the invention the calculated leakby is reported to the user.

In one example embodiment of the invention, the software or firmware used to determine the leakby value may be run by the internal electronics 104 inside flow controller 100. In another example embodiment of the invention, an external device 110, for example a computer, may be connected to input/output port 108 and used to determine the leakby value by running software or firmware that communicates with the flow controller 100. When using an external device to determine the leakby amount, the external device 110, the flow controller 100 and at least one valve used to stop the flow of material through the flow controller may be considered as a test system. The external device 110 may be considered as a test device.

We claim:

1. A method for determining leakby in a flow controller installed in a process equipment using a first valve directly attached to an inlet side of the flow controller and a second valve directly attached to an outlet side of the flow controller, the method performed while the flow controller remains connected to the process equipment, wherein the flow controller includes a thermal mass flow sensor, internal electronics, and a flow control valve that are all integrated within the flow controller, the method executed by the internal electronics inside the flow controller, the method comprising:

stopping flow through the flow controller by closing the first valve and the second valve;
determining a flow rate using a thermal mass flow sensor;
comparing the flow rate with a previously stored flow rate to determine a zero drift (Qdrift) value for the thermal mass flow sensor;
resuming flow through the flow controller by opening the first valve and the second valve;
determining, using the thermal mass flow sensor, a second flow rate (Qflow) through the flow controller when the flow controller is in a fully closed position; and
determining the leakby through the flow controller where the leakby is equal to Qflow-Qdrift.

2. The method for determining leakby of claim 1 where the first valve and the second valve are manually controlled.

3. The method for determining leakby of claim 1 where the first valve and the second valve are electrically controlled.

4. The method for determining leakby of claim 1 further comprising:
waiting a preset time before determining the flow rate through the thermal mass flow sensor.

5. The method for determining leakby of claim 1 further comprising:
comparing the leakby with a threshold value; and
in response to a determination that the leakby is greater than the threshold value, establishing an error condition.

6. A flow controller, comprising:
a flow control valve;
a thermal mass flow sensor; and
internal electronics internal electronics configured to determine a leakby value, while the flow controller remains in place along a fluid supply path of a process equipment, wherein the internal electronics are configured to perform operations to:
stop flow through the flow controller by closing a first valve directly attached to an inlet side of the flow controller and a second valve directly attached to an outlet side of the flow controller;
determine, using the thermal mass flow sensor, a zero drift (Qdrift) value of the flow controller,
determine, using the thermal mass flow sensor, a flow rate (Qflow) through the flow controller when the flow controller is in a fully closed position; and
determine the leakby through the flow controller where the leakby is equal to Qflow-Qdrift.

7. The flow controller of claim 6, wherein the flow controller further comprises:
a display;
an input device; and
adjustment electronics coupled to the thermal mass flow sensor, the flow control valve, the display and the input device and configured to adjust the flow control valve in response to a signal generated by the thermal mass flow sensor indicating a flow rate of a material flowing through the flow controller such that a set flow rate of material through the flow controller is maintained.

8. The flow controller of claim 7, further comprising:
at least one shutoff valve fluidly coupled to the flow controller and configured to stop the flow of material through the flow controller.

9. The flow controller of claim 8 where the at least one shutoff valve is electrically controlled.

10. The flow controller of claim 6, wherein the internal electronics are further configured to perform operations to wait a preset time before determining the flow rate through the thermal mass flow sensor.

11. The flow controller of claim 10, wherein the internal electronics are further configured to perform operations to:
 compare the leakby with a threshold value; and
 in response to a determination that the leakby is greater than the threshold value, establish an error condition.

\* \* \* \* \*